United States Patent [19]
Rosenbaum et al.

[11] 3,810,317
[45] May 14, 1974

[54] DISPLAY SYSTEMS
[75] Inventors: Harold Matthew Rosenbaum, Essex; Francis Duerdin, Herts, both of England
[73] Assignee: The Marconi Company Limited, Chelmsford, Essex, England
[22] Filed: Sept. 5, 1972
[21] Appl. No.: 286,348

[30] Foreign Application Priority Data
Sept. 7, 1971  Great Britain............... 41587/71

[52] U.S. Cl................................................ 35/9 A
[51] Int. Cl. ............................................ G09b 7/00
[58] Field of Search................................ 35/9 A, 5, 6

[56] References Cited
UNITED STATES PATENTS
| | | | |
|---|---|---|---|
| 3,501,851 | 3/1970 | Price et al. | 35/9 A |
| 3,494,051 | 2/1970 | Kobler | 35/5 |
| 3,536,178 | 10/1970 | Breidenbach | 35/5 X |
| 3,277,588 | 10/1966 | Lynott et al. | 35/9 A |
| 3,522,664 | 8/1970 | Lambright et al. | 35/9 A UX |
| 3,521,379 | 7/1970 | Hannah | 35/9 A |

Primary Examiner—Wm. H. Grieb
Attorney, Agent, or Firm—Baldwin, Wright & Brown

[57] ABSTRACT

A display system for use as a teaching aid having support means for supporting a slide having an array of micro-images thereon, a display screen, means for projecting onto the display screen any one of the micro-images from the array and drive means for displacing the support means relative to the projector to enable selection of the micro-image to be displayed. Each micro-image further includes position information relating to the next micro-image to be displayed and this may be modified under control of an operator to produce the modified position information in accordance with which the next image is selected for display.

20 Claims, 5 Drawing Figures

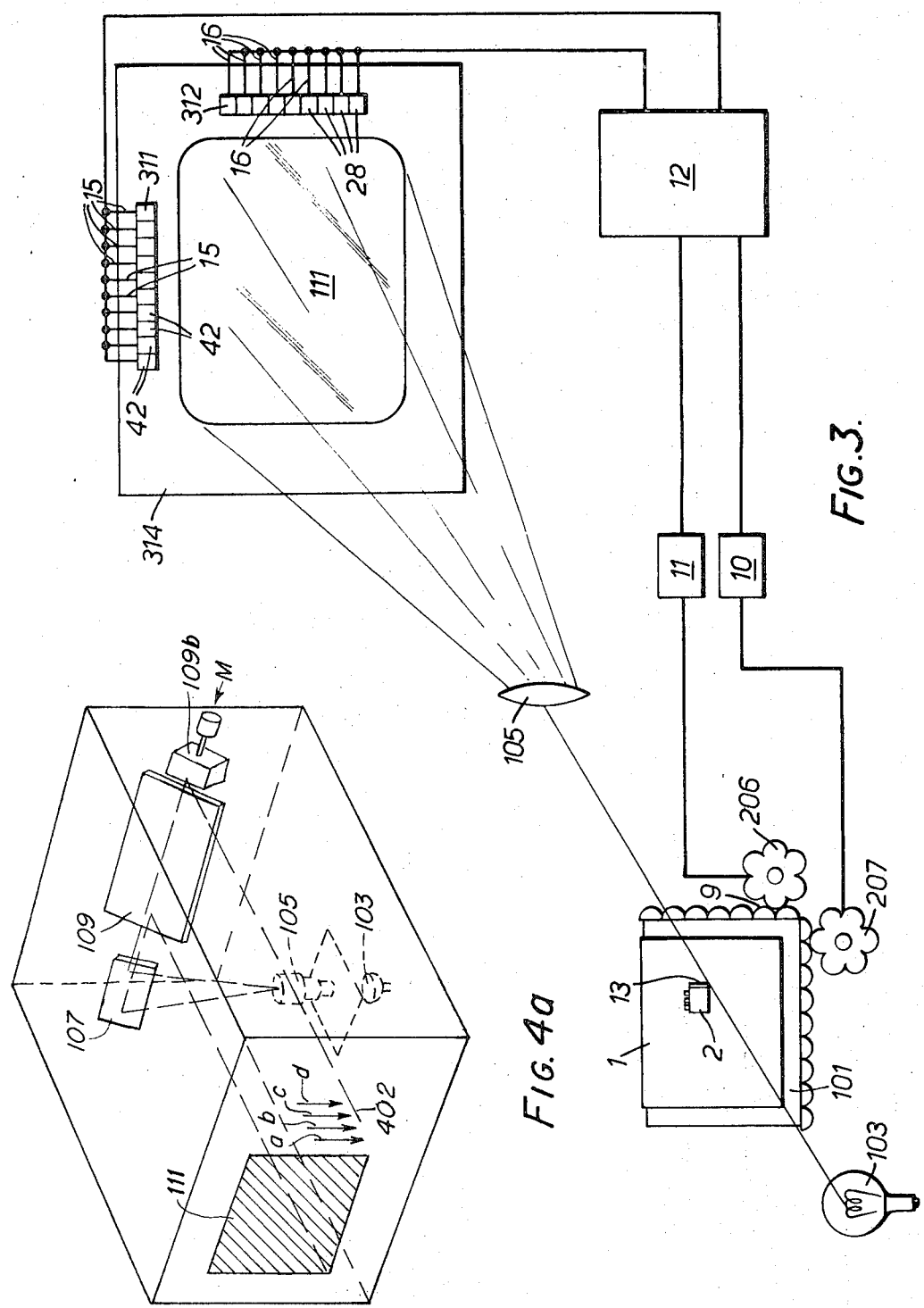

DISPLAY SYSTEMS

This invention relates to a display system for projecting in magnified form any one of an array of discrete micro-images contained on a slide. Typically the slide envisaged would measure 6 inches × 4 inches and contain between 1,000 and 8,000 discrete micro-images.

Such a display system may be used as a visual teaching aid where the information on the slide is in the form of a course and the student has to view the micro-images in a particular sequence as his course progresses. The selection of the next micro-image to be viewed will often depend on the student's success or otherwise in assimilating the information on the displayed micro-image, that is to say, the sequence in which the micro-images are viewed will depend on the student's ability and his rate of progress.

Display systems previously proposed require the viewer to select the next micro-image for projection by manually moving the slide in a carrier or by depressing keys on a keyboard in accordance with instructions on a code table in a handbook in order to effect the required displacement of the slide. Operator selection in this manner is undesirable, being time consuming and is liable to operator error where the nature of the programme necessitates the use of a large number of keys. Of course, manual operation of the slide is even more time consuming.

In accordance with the present invention, there is provided a display system for use as a teaching aid, comprising projection means for projecting onto a display screen any one of an array of micro-images contained on a slide when the latter is placed in the system, drive means for positioning said slide in relation to the projection means, means for reading from each micro-image position information relating to the next micro-image to be displayed, selectively operable modifier means for modifying the read position information and means for controlling the drive means to position the next micro-image to be displayed in dependence upon the modified position information.

Preferably, the position information on each micro-image, when projected, does not fall upon the viewable area of the display screen and has the form of optically readable patterns of light and dark areas. The reading means may either be a stationary array of photo-sensitive elements or a single photo-sensitive element arranged to scan through the displayed pattern.

The modifier means may, for example, be a keyboard having different keys corresponding to different answers displayed on the screen each of which keys is arranged to modify the read position information in a predetermined manner. It is alternatively possible for each key to modify the position information in a manner determined by a position modifying code on the micro-image which is read in a manner analagous to the reading of the position information itself.

As an alternative to the use of a keyboard, it is possible to utilize a hand held light sensing head which is made to read any one of several patterns of light and dark areas projected onto the viewable area of the display screen and to modify the position information accordingly.

The invention will now be described further, by way of example, with reference to the accompanying drawings, in which:

FIG. 3 is a diagrammatic block diagram of a display system.

FIG. 4a is a view similar to FIG. 4 but showing a different form of reading means.

Figure 1:
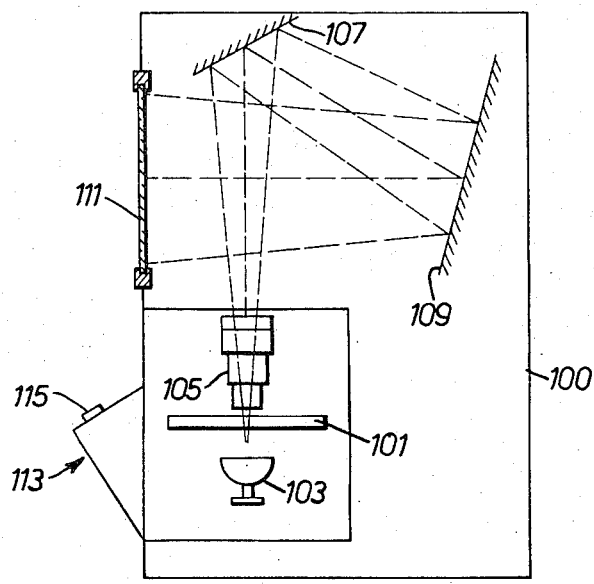
FIG. 1 is a section through the projector of a display system in accordance with the invention.

Referring first to FIG. 1, a display system comprises a light tight cabinet 100 which has a movable frame 101 in which a slide carrying an array of micro-images is mounted. A light source 103 illuminates the slide from one side and the light passing through the slide is focused by means of a lens 105 onto a viewing screen 111 after deflection in a pair of mirrors 107 and 109. Movement of the frame 101 is effected by pressing keys 115 of a keyboard 113 which control drive means now described with reference to FIG. 2.

Figure 2:
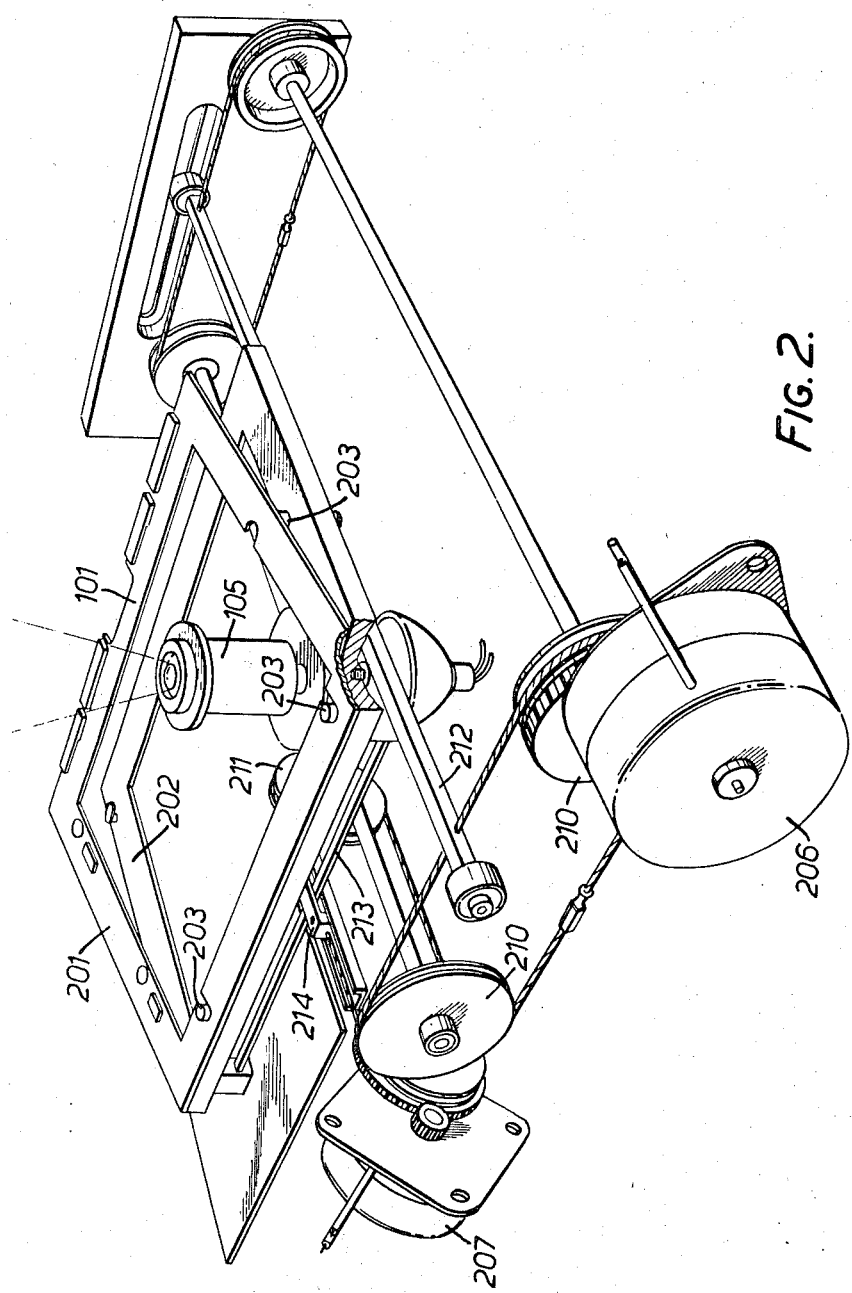
FIG. 2 is a perspective view of the drive means for positioning a slide in relation to the projector.

The drive means shown in FIG. 2 include the frame 101 which consists of two parts 201 and 202 between which the slide is sandwiched. The lower part, as viewed, of the frame 101 is formed with lugs 203 which enable the slide to be located accurately in relation to the frame. The frame 101 is movable in mutually perpendicular directions relative to the projector lens 105 by means of stepping motors 206 and 207. Both the stepping motors are stationary in relation to the cabinet of the display system and are arranged to displace the frame through a pair of belt drives 210 and 211, the lower part 202 of the frame is movable by the belt drive 210 by way of a bar 212 along which the lower part 202 of the frame may be moved longitudinally by the stepping motor 206. Likewise, the belt drive of the stepping motor 207 acts on bar 213 by way of a coupling member 214 which is slidable longitudinally of the bar 213. This arrangement enables the slide to be moved in both an $x$ and a $y$ direction without the separate drive means interfering with one another. As the present invention is not concerned with the drive means of the slide, these means will not be described in any greater detail.

Referring now to FIG. 3, the stepping motors 206 and 207 are here shown diagrammatically driving the frame 101 in which a slide 1 is mounted. A micro-image designated 2 has along one edge a code pattern 13 which when projected by means of the bulb 103 and the lens 105 falls to the right of the viewing screen 111 (as viewed) so as not to be visible by the operator. In the embodiment of FIG. 3, this code pattern is read in parallel by two sets of photo diodes 311 and 312 mounted on the inner face of the front panel 314 of the cabinet. The individual photo diodes 42 and 28 of the sets 311 and 312 are connected by sets of conductors 15 and 16 to a control circuit 12 arranged to control the stepping motors 206 and 207 by way of respective actuator circuits 11 and 10.

Figure 4:
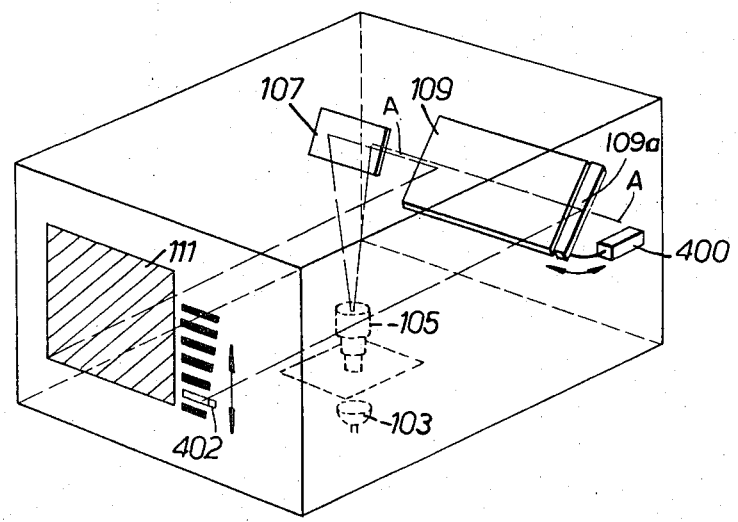
FIG. 4 is a schematic representation of a modification of the system in FIG. 1 by means of which the position information on a micro-image may be read by means of a single photo-sensitive element.

Because of the relatively wide tolerance in positioning the slides in relation to the projection system, it is necessary for the code pattern falling on the photo diodes 311 and 312 to cover a relatively large area. In order to reduce this problem it is possible to use a system similar to the one shown in FIG. 4. This figure is a perspective view of the display system shown in section in FIG. 1 and the same integers have been allocated the same reference numerals. The improvement in this case resides in the fact that one part of the mirror 109 which has been designated 109a is pivotable about a fixed point such as the axis A—A by a suitable actuator 400 which may be solenoid. By periodically pivoting the section 109a of the mirror 109 the code pattern focused to the side of the display screen and shown diagrammatically in FIG. 4 is made to move up and down relative to a single photo diode 402 which then feeds into the control circuit 12 of FIG. 3. This system enables a higher resolution to be used in the vertical direction though broad code patterns have to be projected to compensate for lateral tolerance in the positioning of the slide.

Since in this system the projected code would be scanned both in the forward and reverse directions it may be desirable to provide additional bits of information at the beginning and/or at the end to enable the direction of scanning to be recognised. These additional bits of information may also advantageously be used to provide indication of black and white levels for comparison with the light levels in the projected code. This is necessary to compensate for drift in the electronic circuitry and for any possible stray light entering the display system.

A still further alternative to the arrangement shown in FIG. 4 is shown in FIG. 4a and includes, instead of the section 109a of the mirror 109 four mirrors mounted one on each side of a cube 109b rotatable by means of a suitable motor M. This system offers the advantage that each of the mirrors may be slightly inclined relative to the rotational axis of the cube such that the projected code pattern moves from the left to the right by the respective paths a, b, c and d at the same time as moving vertically (as viewed in FIG. 4) during rotation of the cube. Clearly, such a system can also compensate for lateral tolerance in the positioning of the micro-image so that the code pattern may occupy a smaller area on the slide.

Figure 5:
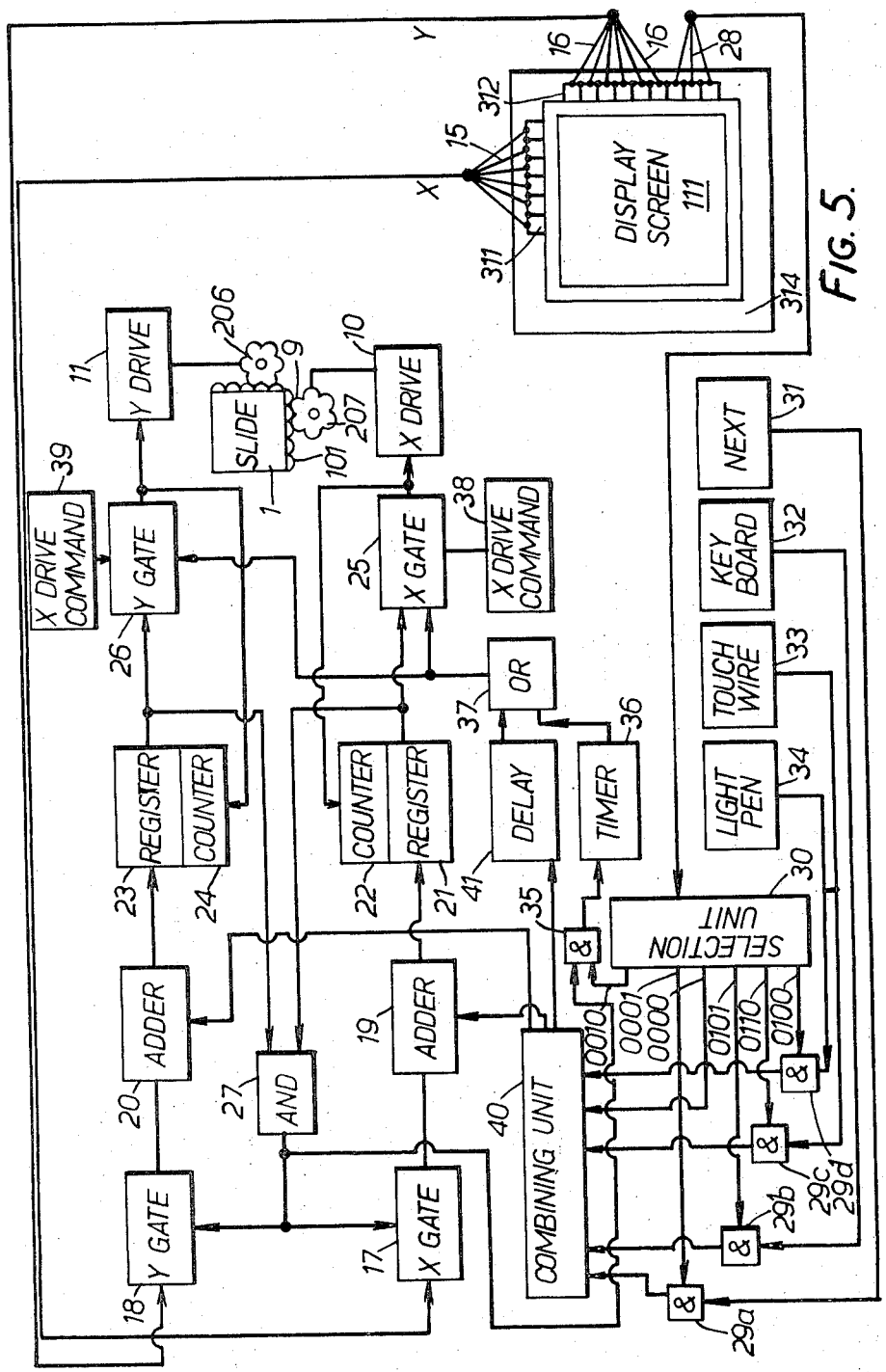
FIG. 5 is a more detailed block diagram of the control circuitry used in the arrangement of FIG. 3.

The system of FIG. 3 will now be described in greater detail with reference to FIG. 5 which shows a display system using a parallel array of photo diodes for detecting the projected code pattern containing positioning information relating to the next micro-image to be displayed. Each of the two sets of photo diodes 311 and 312 is arranged to give over lines 15, 16 six bits of information, one set of bits relating to the x drive signal information and the other to the y drive signal information of the next micro-image to be viewed. These two sets of signals are applied respectively to x and y gates 17 and 18 each of which consists of six parallel connected AND gates. Provided that the x and y drive motors 206 and 207 are stationary, an AND gate 27 is enabled and this in turn enables x and y gates 17 and 18 to gate the address information into x and y adders 19 and 20. Each of the adders 19 and 20 derives another input signal from gate units 29a to 29d for modifying the address read by the photo diodes 311 and 312. These gate units may gate modifying signals from one of several peripheral devices 31, 32, 33 and 34 in dependence upon a further code projected from the micro-image and picked up by a set of photo diodes designated 28. A selection unit 30 analyzes the signal picked up by the photo diodes 28 and enables one of the AND gates 29a, 29b, 29c or 29d to allow modification of the address read from the micro-image by one of the peripheral devices.

The peripheral device 31 designated "NEXT" simply inhibits command to move to the next frame address until pressed by the operator. By enabling an AND gate 35 the selection unit 30 vests control in a timer 36 which provides a pre-set pause before automatically moving to the next frame.

An enabling input to AND gate 29d vests control in a light pen 34 which may simply consist of an optical fibre which is manually moved by the operator over a code pattern projected onto a visible portion of the display screen. This code pattern is then fed to the adders 19 and 20 by way of the AND gate 29d and the combining unit 40 to effect modification of the address read from the micro-image. An alternative form of light pen may comprise several fibres so that it may read all the coded bits of information simultaneously.

Another form of peripheral device may be a touch wire 33 having the form of an overlay on the display screen providing a touch sensitive "keyboard." The overlay would preferably be transparent to allow for unimpeded use of the entire display screen. Each separately coded area on the touch wire could be activated by capacitance between that area and the operator's finger. This arrangement enables any key on the keyboard to be labelled in a different manner with each projected micro-image.

If AND gate 29d is enabled, control is vested in a keyboard 32 having a plurality of keys each of which is arranged to effect a predetermined modification of the read address. When a micro-image vests control in a keyboard, it is advantageous for further code patterns to be detected from the micro-image for enabling only selected ones of the keys in the keyboard. For example, in a case where a student is required to turn to one of three micro-images on the slide depending on his ability in assimilating information on the display slide it is preferable for only the keys on the keyboard which would lead to one of these micro-images being displayed next to be operative. If such a measure is not taken, in the event of a student pressing the wrong key by accident the complete sequence would be upset and the student would find it difficult to resume the course.

The peripherals 31 to 34 have been given only as examples of means for modifying the address read from the image and any display system need only be capable of accepting one of these peripheral devices. In a system capable of utilization with more than one form of peripheral device it is not essential to include on the slide a code relating to which peripheral device should be used since other switching means may be used to control the peripheral device feeding into the adders 19 and 20.

The output of the adders 19 and 20 is stored in registers 21 and 23 respectively, whose outputs are connected to AND gates 25 and 26 respectively. Each of the AND gates 25 and 26 is enabled by a signal from the combining unit 40 after the count in the adders 19 and 20 has been stored in the registers 21 and 23. The signal from the combining unit 40 is delayed by a delay unit 41 before being fed by way of an OR gate 37 to the x and y gates 25 and 26 in order to allow sufficient time for the summation to take place in the adders 19 and 20. As seen, the OR gate 37 is also connected to the previously mentioned timer 36 which may form one of the peripheral devices of the display system. When a signal is present at both inputs of the gates 25 and 26 the latter allow signals from respective oscillators 38 and 39 which are labelled "DRIVE COMMAND" to $x$ and $y$ drive circuits 10 and 11 which then actuate the motors 207, 206 to effect the desired movement of the slide 1 carried in the frame 101. As the slide is moved, the pulse train applied to the drive circuits 10 and 11 is fed back to counters 22 and 24 and when parity is reached between the counters 22, 24 and the registers 21, 23 the slide is at the desired position and the drive is discontinued.

Though the $x$ and $y$ addresses are treated separately in the described system, they could usefully be connected such that if any of the modified code bits added to the $x$ frame address causes the sum to exceed the maximum number allocated to $x$, the excess would be carried automatically into the $y$. This means in practice that the modifier could be used to direct the slide from a micro-image near to the end of one row to one near to the beginning of the next row. This could be achieved by simply using one adder unit so that the two sets of six bit information would be treated as one set of twelve bit information.

A further improvement of the system may be achieved by projecting further code patterns which may be used to address directly other external devices. For example, it may sometimes be desirable to project on the same screen as the micro-image a more detailed or colour photograph which cannot with present techniques be recorded on the size contemplated for use with the present invention. It is possible, however, by projecting a further code pattern to bring in automatically a conventional projector of colour slides arranged adjacent the display system to project onto the same display screen a photograph having the improved resolution. It would also be possible to use such additional code patterns to enable a teacher to monitor the progress of the various students, or to operate any other device such as a tape recorder or a computer.

Whilst the invention has been particularly described with reference to its application in education, it should be understood that the scope of application of the invention extends to other fields where it is required to display the micro-images on a slide in particular sequences.

We claim:

1. In a display system suitable for use as a teaching aid, comprising:

support means for supporting a slide having an array of micro-images thereon each having a single coded instruction associated therewith containing position information relating to a predetermined other micro-image, a display screen having a display area viewable by an operator, projection means for projecting onto said display screen a micro-image selected from the array on the slide, and drive means for displacing said support means relative to said projection means to enable selection of the micro-image to be displayed, the improvement wherein there are further provided;

reading means for reading from each displayed micro-image that position information contained in the single coded instruction associated therewith, modifier means under the control of an operator for modifying the read position information as necessary to produce modified position information relating to the next micro-image to be displayed, and control means for actuating said drive means in accordance with the modified position information to position said support means for display of the next micro-image.

2. A display system as claimed in claim 1, in which the projection means is arranged to project the position information onto an area of the display screen other than the said display area and the position information has the form of optically readable patterns of light and dark areas.

3. A display system as claimed in claim 2, in which the means for reading the position information comprises a set of photo-sensitive elements arranged around the part of the screen constituting the display area.

4. A display system as claimed in claim 2, in which the reading means comprises a single photo-sensitive element and means for scanning the position information.

5. A display system as claimed in claim 4, in which the means for scanning the projected position information comprises a pivotable reflective surface arranged to reflect portions of the position information sequentially onto the single, stationary, photo-sensitive element.

6. A display system as claimed in claim 4, in which the means for scanning the projected position information includes a rotatable polygonal block having a reflective surface on each side arranged to reflect portions of the position information sequentially onto the single, stationary, photo-sensitive element.

7. A display system as claimed in claim 6, in which the faces of the polygon are inclined relative to the rotational axis thereof in such a manner that the images reflected by the different sides are displaced in relation to one another in a direction perpendicular to the direction of scanning.

8. A display system as claimed in claim 1, in which the modifier means includes a keyboard having a plurality of keys each arranged to effect a predetermined modification of the position information read from the micro-image.

9. A display system as claimed in claim 8, in which for any micro-image only selected ones of the keys on the keyboard are capable for modifying the read position information and in which means are provided for reading further information from the displayed micro-image to render the remainder of the keys inoperative.

10. A display system as claimed in claim 1, in which the modifier means includes a light pen manually controllable to read additional information displayed on the display area of the screen and to modify the position information read from the micro-image accordingly.

11. A display system as claimed in claim 1, in which the modifier means includes a touch wire having transparent areas overlying a portion of the display area each of which areas is arranged to modify the read position information when touched by an operator.

12. A display system as claimed in claim 1, in which means are provided for reading a further code from the displayed micro-image which means may control an external device such as a monitoring panel, a computer, a tape recorder or a conventional slide projector.

13. A display system as claimed in claim 1, having more than one form of modifier means and further comprising means for reading information from the projected micro-image to select between the various forms of modifier means.

14. In a display system suitable for use as a teaching aid, in combination:
   slide means having an array of micro-images thereon, each image having a major portion constituting a display and a minor portion presenting coded information;
   display screen means having an area for presentation of a major portion of a selected micro-image;
   reading means disposed in a fixed region for reading the coded information associated with said selected micro-image; and
   projection means for projecting the selected micro-image such that said major portion thereof is displayed on said area of the display screen means and said minor portion thereof is projected at least in the vicinity of said region occupied by said reading means, said projection means including movable means for altering the projected position of said coded information whereby at least transiently to actuate said reading means.

15. In a display system as defined in claim 14 wherein said projection means includes a fixed reflector projecting said major portion of the selected micro-image and a movable reflector constituting said movable means.

16. In a display system suitable for use as a teaching aid, in combination:
   slide means having an array of micro-images thereon, each such image having a major portion of information to be displayed and a minor portion adjacent thereto which contains coded information;
   projection means for projecting a selected micro-image such that said major portion is displayed in one area and said minor portion is projected to a second area for reading;
   reading means within said second area for reading the coded information of said minor portion of the selected micro-image, said coded information as projected being sufficiently small in size as to fall within said second area without being detected by said reading means; and the improvement comprising means incorporated in said projection means for moving said coded information as projected within said second area so as to be detected and read by said reading means.

17. In a display system as defined in claim 16 wherein the projection means includes a fixed reflector presenting the major portion of said selected micro-image to said one area and wherein the means last mentioned comprises a movable reflector scanning said coded information without said second area.

18. In a display system suitable for use as a teaching aid, in combination:
   a display screen occupying a first area;
   reading means occupying a second area which is miniscule compared with said first area;
   micro-image means presenting an array of individual micro-images each having a large portion thereof which may be projected to occupy said first area occupied by the display screen and a small portion representing coded information;
   projection means for projecting the large and small portions of a selected micro-image independently to said first and said second areas respectively and including means for dithering the projected position of said coded information so as to assure that it is intercepted by the miniscule area occupied by said reading means; and
   drive means for positioning said micro-image means in response to the intercepted coded information to select a micro-image for subsequent display.

19. In a display system as defined in claim 18 wherein the coded information of each micro-image relates only to one other micro-image which would be next displayed unless the coded information is modified; and including operator controlled means for modifying the intercepted coded information to actuate the drive means and position the micro-image means for display of a micro-image different from that corresponding to said one other micro-image which would be next displayed.

20. In a display system suitable for use as a teaching aid, in combination:
   support means for supporting a slide having an array of micro-images thereon each having a single coded instruction associated therewith relating to a predetermined other micro-image;
   a display screen having a display area viewable by an operator;
   projection means for projecting any micro-image of said array onto said display screen;
   drive means for displacing said support means relative to said projection means to cause a selected micro-image to be displayed;
   reading means associated with said display screen for reading that single coded instruction projected by said projection means and associated with said selected micro-image to produce position information therefrom;
   control means for actuating said drive means in accord with position information received thereby to position said support means to cause display of a next micro-image; and
   modifier means connecting said reading means to said control means for selectively modifying said position information produced by said reading means so that the said next micro-image to be displayed may be different from the predetermined other micro-image associated with the coded instruction read by said reading means.

* * * * *